United States Patent [19]

Harding

[11] E Patent Number: Re. 31,869

[45] Reissued Date of Patent: Apr. 23, 1985

[54] BOTTLE CAPS

[75] Inventor: Sune Harding, Partille, Sweden

[73] Assignee: AB Wicanders Korkfabriker, Alvangen, Sweden

[21] Appl. No.: 825,190

[22] Filed: Aug. 16, 1977

Related U.S. Patent Documents

Reissue of:

[64] Patent No.: 3,963,140
Issued: Jun. 15, 1976
Appl. No.: 536,719
Filed: Dec. 27, 1974

[51] Int. Cl.[3] ..... B65D 41/42

[52] U.S. Cl. ..... 215/254

[58] Field of Search ..... 215/250–256

[56] References Cited

U.S. PATENT DOCUMENTS

| | | | |
|---|---|---|---|
| 2,068,444 | 1/1937 | Breckenridge | 215/254 |
| 3,199,705 | 8/1965 | Brockett | 215/254 |
| 3,216,602 | 11/1965 | Koll | 215/254 |
| 3,276,613 | 10/1966 | Bozek | 215/254 |
| 3,310,192 | 3/1967 | Edwards | 215/254 |
| 3,338,445 | 8/1967 | Lange | 215/254 |
| 3,397,661 | 8/1968 | Allman | 215/254 X |

FOREIGN PATENT DOCUMENTS

| | | | |
|---|---|---|---|
| 342199 | 1/1972 | Sweden | 215/254 |

*Primary Examiner*—Donald F. Norton
*Attorney, Agent, or Firm*—Brumbaugh, Graves, Donohue & Raymond

[57] ABSTRACT

A bottle cap is disclosed having a tear tab cooperating with score lines extending across the top of the cap for manual removal of the cap from a bottle. The score lines are located slightly spaced from the peripheral edge of the top of the cap and arranged at least partly around the periphery of the cap. This arrangement of the score lines serves to obtain an easy removal of the cap from the bottle after the tearing operation and is moreover in combination with the sealing element effectively preventing any risk for corrosion along the score lines.

9 Claims, 4 Drawing Figures

BOTTLE CAPS

Matter enclosed in heavy brackets [ ] appears in the original patent but forms no part of this reissue specification; matter printed in italics indicates the additions made by reissue.

BACKGROUND OF THE INVENTION

Many different types of manually removable bottle caps have been known heretofore. Such caps include tear tabs of various designs as well as sealing elements bonded to the undersurface of the top of the cap. Said tear tab serves as a lever arm, so that during the tearing operation, forces tending to pull the cap from the bottle are exerted along the top surface of the cap. At the beginning of the tearing operation, the skirts grips the bottle so that the forces exerted by the tear tab acts to tear the cap along the score lines. As the cap is torn, however, the grip of the skirt on the bottle is relaxed, when the grip of the skirt is relaxed enough, the cap is lifted from the bottle neck.

Such sealing caps must be constructed so that they provide an efficient seal for the opening, but are still easy to remove by manually tearing up a flap projecting from the cap which, for this purpose, cooperates with tear-off indications extending across the top of the cap. In order to achieve the necessary seal, such caps are provided with a seal abutting the mouth of the bottle. Furthermore, the seal should be constructed so that it holds the cap together in one piece after it has been torn up and removed from the opening, so that if necessary it can be used again to temporarily close the bottle opening.

The few bottle caps utilized heretofore which do have a capability of being reused, generally are not sufficiently released from their claw-grip around the neck during the tearing operation, i.e. the lower part of the cap which during the sealing operation is bent around the neck of the container opening is not sufficiently released so that the cap after tearing can easily be drawn from the opening. If this release cannot be achieved special manipulations are necessary for removing of the cap, which is made more difficult by the relatively sharp edges obtained by the tearing operation. Thus, said sharp edges may easily result in cuts or other damages. This problem is particularly noticeable with caps employed on openings having relatively large diameters and is even more pronounced if the sealing element consists of an insert covering the total undersurface of the cap and which, with the object of providing an efficient re-sealing, is constructed so that it is retained unbroken during the tearing operation. This type of sealing element also contributes to a certain extent to the clawgrip mentioned above. Furthermore, for technical reasons during manufacturing of said caps it has previously been necessary to use a seal covering the whole undersurface of the cap in order to eliminate any risk of corrosion which might otherwise easily occur along the tear lines. Normally the cap blank is provided at least on one surface with a layer of a corrosion-resistant varnish before the tear-off indications are applied, but said layer is obviously damaged when the tear-off indications are employed by punching or the like. Resulting corrosion risks could of course be avoided by subsequent re-varnishing of the cap, but this in turn involves a troublesome additional stage in the production line and instead the seal has been allowed to cover the entire undersurface of the cap. The disadvantage of this is of course a considerably increased cost for the material for the seal itself, although the effective sealing surface in fact need only be within a narrow region located over the neck surrounding the opening of the bottle.

SUMMARY OF THE INVENTION

It is one object of the present invention to provide resauble bottle cap which after the tearing operation eliminates the above mentioned claw-grip and thus permits easy removal of the torn cap from the bottle opening, whereby the cap remains in one piece and thus could be reused as a temporary closure.

Another object of the invention is to provide a reusable cap in which the sealing material covers only a part of the undersurface of the cap sufficient to provide the intended sealing effect against the neck of the bottle opening, but still effectively preventing any risk of corrosion along the score lines.

These and other objects have been achieved by the present invention which includes resauble bottle cap having a substantially planar top wall portion with an annular depending skirt and a tear tab projecting from said skirt, as well as tear-off indications or preformed score lines comprising two weakening lines extending substantially in line with the edges of the tear tab, across the peripheral skirt section of the cap and up to the top wall of the cap, each of said weakening lines being arranged to run therefrom along and slightly spaced from the boundary of the top wall portion of the cap at least for part of the way around the periphery of said top wall portion.

The suggested arrangement of said score lines results in elimination of the claw-grip, so that the cap can be removed easily after having been torn up.

This effect can be further improved by at least one of the tear-off indications continuing to the peripheral section of the cap on the side of the cap blank opposite the tear tab. This prevents the cap from being torn into several parts—which would make it impossible to use the cap as a temporary closure—since the seal inside the cap is attached to the cap in such a way that it holds the parts of the cap together after removal.

DESCRIPTION OF THE DRAWINGS

For a further understanding of the present invention reference may be had to accompanying drawings, in which.

BRIEF DESCRIPTION OF THE PREFERRED EMBODIMENTS

Figure 1:
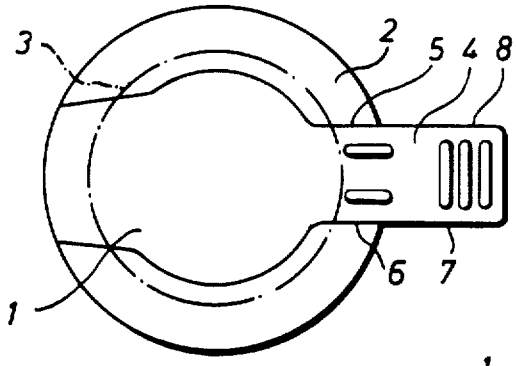
FIG. 1 shows a planar blank of material for manufacturing of a cap.
Figure 2:
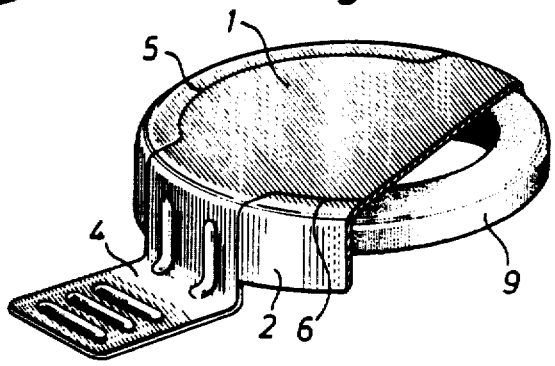
FIG. 2 shows a view of a cap formed from the material blank shown in FIG. 1.
Figure 3:
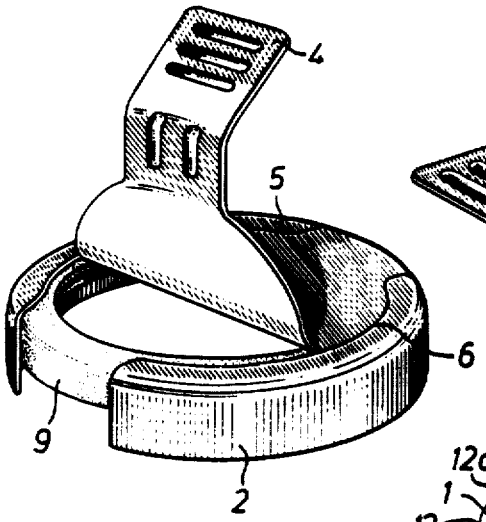
FIG. 3 shows the cap of FIG. 2 being torn up.

FIG. 1 shows a planar material blank intended to be formed into the cap blank shown in FIG. 2 and 3. The material blank consists of light metal, preferably aluminum, and includes an inner, circular, substantially planar top wall portion 1 surrounded by an outer, peripheral skirt cap section 2. The boundary between these two parts has been indicated by a broken line 3. An element projects radially from the peripheral cap section 2 to serve as a tear tab 4. Two tear-off indications or score lines 5, 6 in the form of stamped or punched weakening or cutting lines extend across the blank, each continuing as an extension of the side edges 7, 8 of the tear tab 4. Said score lines 5, 6 extend initially across the part of the peripheral section 2 located between the tear tab 4 and the top wall portion 1 of the cap, and each then continues along a part of the periphery of said top wall portion of the cap 1, i.e. slightly spaced from the line 3, and then on across the entire top wall portion of the cap, running down to the edge of the peripheral part 2 opposite to the tear tab 4.

FIG. 2 shows a cap blank made from the material blank shown in FIG. 1, having a ring seal 9 arranged in the cap blank in such a way that it covers the score lines 5, 6. In order to keep the cap in one piece after the tearing operation, the ring seal 9 may be bonded to the undersurface of the cap at suitable points by means of glue or the like. Such glue areas should be located so that they do not extend across score line areas as they might obstruct the tearing process. However, if a tear-stop is desired for some reason, such a glue area may be applied over the score lines at a suitable point.

FIG. 3 shows a partially torn cap blank. As mentioned above, the tearing operation can easily be controlled by arranging adhesive patches between the seal and the appropriate area of the score lines. In the embodiment shown the ring seal 9 is completely intact when the cap has been torn off, but of course if desired the seal may also be arranged in the region of the tear tab 4 so that it is torn when the cap is removed (as shown in FIG. 4).

Figure 4:
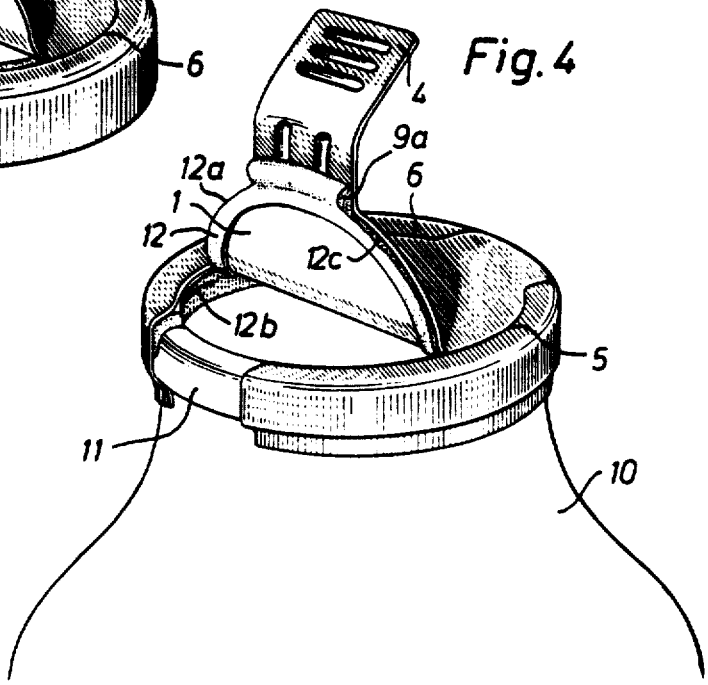
FIG. 4 shows a cap made from a cap blank according to the invention, on the neck of a bottle after having been torn up.

FIG. 4 shows a cap according to the present invention after application on the neck of a bottle 10, i.e. around the neck 11 at the opening of the bottle, after having been torn up. The ring seal 9 is formed with a thin, lip-shaped extension 12 directed towards the centre of the cap and covering the area on both sides (see 12a, 12b) of the score lines 5, 6 where they run concentrically with the periphery of the cap. In this case, the inside of the cap is provided with an adhesive lacquer at least in the zone corresponding to the sealing ring.

When tearing the cap shown in FIG. 4, the sealing ring 9a, nearest the tab 4, is broken and then a further pulling on tab 4 is tearing the thin extension or film 12 positioned within the area of the score lines 5, 6 resulting in that one part 12a of the film 12 remains on the torn top wall portion 1 of the cap and the other part 12b remains in one piece with the film 12. In this way, the relatively sharp metal edges obtained during the tearing operation are masked by a part 12c of the torn film 12, thus reducing the risk of cuts. Said film 12, which preferably consists of plasticized polyvinylchloride, constitutes an effective protection against corrosion and, since it is thin, could be easily torn.

The invention is of course not limited to the embodiments shown in the drawings, but can be varied in many ways within the scope of the following claims. Thus, the score lines may extend only a short way across the top wall portion of the cap, for example over half the top wall portion. A preferred location of said score lines from the opening point of view is obtained if the three segments formed by the two side segments on each side of the score lines and the rear segment between the lines are made equally long.

It is important that the ring seal always covers the score lines and that the score lines at least on a part of the top wall portion opposite the tear tab, are arranged close to the periphery of the top wall portion, so that the desired elimination of the claw-grip is obtained since the peripheral parts of the cap are automatically pressed out from the neck of the bottle opening during the tearing operation.

The location of the score lines within the area of said ring seal ensures the desired resistance against corrosion and this is even further improved since the seal is pressed against the score lines when the cap is applied on the bottle opening.

Naturally, it is also possible to use a disc of sealing material which entirely covers the undersurface of the cap instead of the ring seal shown in the drawings.

We claim:

1. A cap for a container having a neck defining an opening, said cap comprising an upper wall to overlie the opening and having a peripherally depending skirt to engage the neck to secure the cap in position over the opening and a tear tab projecting radially from said skirt, and score lines on said wall defining a tear portion, said score lines consisting of two weakening lines traversing the cap at least one of which extends across opposite portions of said skirt substantially in line with an edge of said tear tab, each of said weakening lines on said upper wall being arranged substantially adjacent and parallel to the boundary between said upper wall and the skirt, and a peripheral sealing element bonded to the inside surface of the wall and covering said inside surface of the wall along the length of said score lines.

2. The cap of claim 1 wherein the sealing element consists of a ring seal.

3. The cap of claim 2, wherein said ring seal is bonded to the cap within the area of said tear portion and is broken during the initial tearing operation.

4. The cap of claim 2 wherein said ring seal comprises a thin film on both sides of each of the score lines along their length and said film is arranged to be broken during the tearing operation so that the relatively sharp tear edges obtained are masked to a certain extent by said film.

5. The cap of claim 1 wherein the bond between said sealing element and said wall comprises an adhesive.

6. The cap of claim 1 in which each of said weakening lines extends across opposite portions of said skirt substantially in line with an edge of said tear tab.

*7. A tear-off convenience bottle cap comprising a circular top panel surrounded by a cylindrical skirt terminating in a lowermost free edge, a radiused juncture portion connecting said top panel and said skirt, a gripping ear formed as an integral part of said skirt extending downwardly and radially outwardly from said free edge, a tearing zone commencing at said skirt free edge on either side of said gripping ear and extending upwardly across said skirt, each of said tearing zones blending in an outwardly diverging pattern into a path lying in close proximity to the periphery of said cap top panel, said tearing zones extending rearwardly from said gripping ear so as to partially surround said cap top panel and an annular sealing gasket adhesively affixed to said cap interior so as to completely overlie said tearing zones along said path whereby removal of said cap causes tearing of said gasket along said path.*

*8. A tear-off convenience closure as in claim 7, the mass of said sealing gasket being disposed radially outwardly of said tearing zone path.*

*9. A tear-off convenience bottle cap comprising a circular top panel surrounded by a cylindrical skirt terminating in a lowermost free edge, a radiused juncture portion connect-*

*ing said top panel and said skirt, a gripping ear formed as an integral part of said skirt extending from said free edge, a tearing zone commencing at said skirt free edge adjacent said gripping ear and extending upwardly across said skirt and blending into a path lying in close proximity to the periphery of said cap top panel, said tearing zone extending rearwardly from said gripping ear to at least partially surround said cap top panel and an annular sealing gasket adhesively affixed to said cap interior so as to completely overlie said tearing zone along said path with the mass of said sealing gasket being disposed radially outwardly of said tearing zone path and leaving a thinned out section of sealing gasket overlying said tearing zone path whereby removal of said cap causes tearing of said gasket along said path.*

* * * * *

UNITED STATES PATENT AND TRADEMARK OFFICE

CERTIFICATE OF CORRECTION

PATENT NO. : Re. 31,869

DATED : April 23, 1985

INVENTOR(S) : Sune Harding

It is certified that error appears in the above-identified patent and that said Letters Patent is hereby corrected as shown below:

First page, the following should be inserted:

-- [30] Foreign Application Priority Date

May 10, 1974 [SE] Sweden..... 7406245 --.

Signed and Sealed this

*Eighth* Day of *October 1985*

[SEAL]

*Attest:*

*Attesting Officer*

DONALD J. QUIGG

*Commissioner of Patents and Trademarks—Designate*